United States Patent
Dutt et al.

(10) Patent No.: US 6,202,114 B1
(45) Date of Patent: Mar. 13, 2001

(54) SPANNING TREE WITH FAST LINK-FAILURE CONVERGENCE

(75) Inventors: Dinesh Dutt, Santa Clara, CA (US); Silvano Gai, Vigliano d'Asti (IT); Keith McCloghrie, San Jose, CA (US)

(73) Assignee: Cisco Technology, Inc.

( * ) Notice: Subject to any disclaimer, the term of this patent is extended or adjusted under 35 U.S.C. 154(b) by 0 days.

(21) Appl. No.: 09/002,115

(22) Filed: Dec. 31, 1997

(51) Int. Cl.[7] ................................................ G06F 13/00
(52) U.S. Cl. ................................. 710/129; 714/4
(58) Field of Search ........................ 714/1–4; 709/200, 709/220–224, 238, 239, 242, 252

(56) References Cited

U.S. PATENT DOCUMENTS

| | | |
|---|---|---|
| 4,466,060 | 8/1984 | Riddle . |
| 4,706,080 | 11/1987 | Sincoskie . |
| 4,769,814 | 9/1988 | Bederman et al. . |
| 4,811,337 | 3/1989 | Hart . |
| 5,018,137 * | 5/1991 | Backes et al. ................... 370/85.13 |
| 5,056,085 | 10/1991 | Vu . |
| 5,150,360 | 9/1992 | Perlman et al. . |
| 5,245,609 | 9/1993 | Ofek et al. . |
| 5,315,592 | 5/1994 | Conant et al. . |
| 5,606,669 | 2/1997 | Bertin . |
| 5,630,184 | 5/1997 | Roper et al. . |
| 5,734,824 * | 3/1998 | Choi ............................... 395/200.11 |
| 5,737,316 * | 4/1998 | Lee ..................................... 370/248 |
| 5,790,808 * | 8/1998 | Seaman ......................... 395/200.53 |
| 5,878,232 * | 3/1999 | Marimuthu ..................... 395/200.79 |
| 5,926,463 * | 7/1999 | Ahearn et al. ....................... 370/254 |
| 5,940,771 * | 8/1999 | Gollnick et al. .................... 455/517 |

* cited by examiner

Primary Examiner—David A. Wiley
(74) Attorney, Agent, or Firm—Jay A. Chesavage

(57) ABSTRACT

The Spanning Tree Protocol converges to a new configuration after the loss of a link. A new frame, known as a root link query request BPDU is transmitted to the root bridge in the spanning tree when a bridge detects an indirect link failure through the reception of an inferior BPDU on a blocked port. Each bridge forwards this root link query until the root link query reaches the last reachable upstream bridge or a bridge which has a different Tx_Root_Id than the one identified in the RLQ-REQ-BPDU. If the last reachable bridge is the root bridge identified in the RLQ-REQ-BPDU, then a second new frame known as an RLQ-ACK-BPDU is sent, and the bridge port receiving this acknowledgment BPDU is changed from a blocked port to a designated port. If the RLQ-REQ-BPDU reaches a bridge with a different Tx_Root_Id than the one in RLQ-REQ-BPDU, a third new frame known as RLQ-NAK-BPDU is sent.

18 Claims, 17 Drawing Sheets

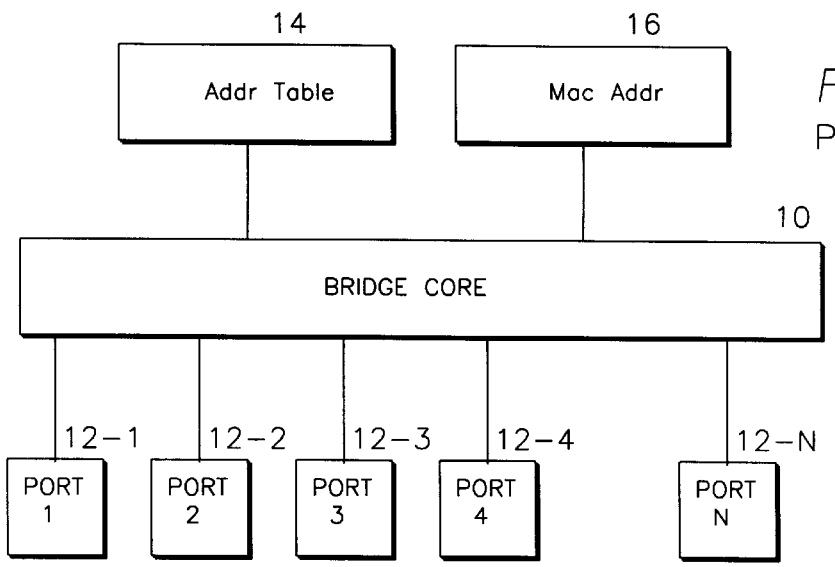
*Figure 1:*
PRIOR ART
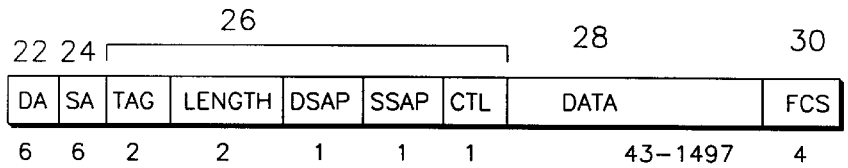
*Figure 2:*
PRIOR ART
*Figure 3* PRIOR ART
ADDRESS TABLE FOR B1
| | ADDR | Port of Entry | |
|---|---|---|---|
| 30a | B2 | P1 | 31a |
| 30b | B3 | P2 | 31b |
| 30c | B4 | P1 | 31c |
| 30d | B5 | P1 | 31d |
| 30e | A1 | P2 | 31e |

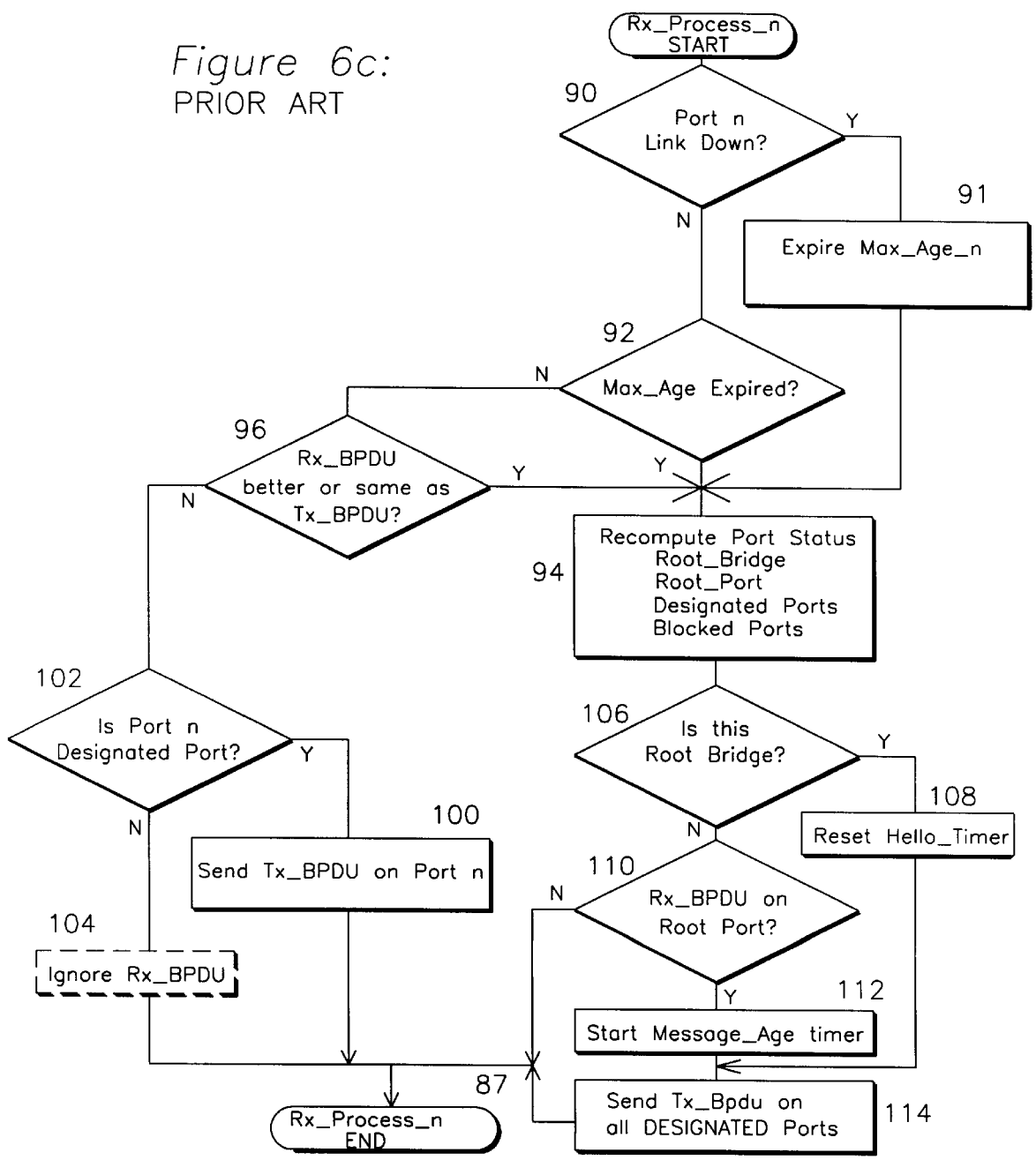
Figure 6c: PRIOR ART

B14 Rx Data Structures

| Rx_Port_ID | Port 1 | Port 2 | Port 3 | Port 4 | ooo | Port n |
|---|---|---|---|---|---|---|
| Port State | B | B | R | D | | |
| Rx_Root_ID | B10 | B10 | B10 | B16 | | |
| Rx_Cost_to_Root | 110 | 110 | 40 | 0 | | |
| Rx_Bridge_ID | B15 | B11 | B13 | B16 | | |
| | | | | | | |

Rx_Message_Age
Rx_Max_Age
Rx_Hello_Time
Rx_Fwd_Delay

*Figure 7*
PRIOR ART

B14 Tx Data Structures

| | |
|---|---|
| Tx_Root_ID | B10 |
| Tx_Cost_to_Root | 40 |
| Tx_Bridge_ID | B14 |
| Tx_Message_Age | B10_Message_Age |
| Tx_Max_Age | B10_Max_Age |
| Tx_Hello_Time | B10_Hello_Time |
| Tx_Fwd_Delay | B10_Fwd_Delay |

Tx_BPDU

| Size | | |
|---|---|---|
| 2 | 0 | Protocol Identifier |
| 1 | 0 | Version |
| 1 | 0 | Message Type |
| 1 | TCA ... TC | |
| 8 | Root_ID | |
| 4 | Cost_to_Root | |
| 8 | Bridge_ID | |
| 2 | Port_ID | |
| 2 | Message_Age | |
| 2 | Max_Age | |
| 2 | Hello_Time | |
| 2 | Fwd_Delay | |

Figure 14

| Time | Event | B11 RCV/SEND | B14 RCV/SEND | B12 RCV/SEND | B13 RCV/SEND |
|---|---|---|---|---|---|
| 0 | Link breaks, B11 MAX_AGE promoted to EXPIRE. | Nothing/ R=B11 | R=B11/ R=B10 | R=B11/ R=B10 | R=B10/ R=B10 |
| MAX_AGE (20s) | B12, B13, B14 Stored BPDUs Achieve MAX_AGE, try to become ROOT. | Nothing/ R=B11 | R=B11/ R=B10 | R=B11/ R=B10 | R=B10/ R=B10 |
| ~20s | B11, B12, B13, B14 spanning tree reconfigured. | R=B10/ R=B10 | R=B10/ R=B10 | R=B10/ R=B10 | R=B10/ R=B10 |
| ~50s =20s + 2x FWD_DELAY | New configuration is Forwarding Traffic. | | | | |

Figure 16

| Time | Event | B11 RCV/SEND | B14 RCV/SEND | B12 RCV/SEND | B13 RCV/SEND |
|---|---|---|---|---|---|
| 0 | Link breaks, B11 MAX_AGE promoted to EXPIRE, B11 tries to become ROOT | Nothing/ R=B11 | R=B11/ RLQ_BPDU R=B10 | | |
| 2s | On Receipt of inferior BPDU from B11, B14 and B12 Promote MAX_AGE to EXPIRE. B14 sends RLQ. | | | | |
| 2s | RLQ -> B13 -> B12 -> B11 RLQ_NAK -> B12 -> B13 -> B14 B14 Finds new ROOT port among BLOCKED / DESIGNATED Ports. | | | | |
| 3s | B12,B13 Reconfigured in New Spanning Tree | | | | |
| ~33s | New Configuration is again Forwarding Traffic | | | | |

= 3s + 2x FWD_DELAY

SPANNING TREE WITH FAST LINK-FAILURE CONVERGENCE

FIELD OF THE INVENTION

The current invention applies to the field of network configuration protocols which automatically configure a meshed network into a loop-free topology. One such automatic network configuration protocol is known as the Spanning Tree Protocol, and the present invention is directed to an improvement to the Spanning Tree Protocol which is capable of reducing reconfiguration time in the presence of either the failure or intentional removal of existing network equipment or interconnecting cables.

BACKGROUND OF THE INVENTION

Computer networks comprise interconnected bridges and routers which are responsible for the forwarding of frame traffic principally generated by computers at end stations. The function of each of these bridges and routers is to provide an appropriate degree of isolation between various parts of the network, which has the effect of increasing the bandwidth available to each user of the network. The level of desired isolation provided by each of these elements is related to the hierarchy level in which each element operates in the 7 layers defined by the OSI Reference Model.

A bridge (or switch) is a Layer 2 entity that is typically a computer with a plurality of ports that couple the bridge to other entities. The bridging function includes receiving data from a port and transferring that data to other ports for receipt by other entities. A bridge is able to move data frames from one port to another very fast since its decision is based only on end-station MAC address information contained in such frames. The IEEE 802.3 standard specifies a fixed location for these MAC addresses in the frame. In this manner, bridges typically utilize a series of high speed, low cost state machines for the movement of data.

Most computer networks have redundant communication paths. In general, such redundant paths in a network are desirable, as they prevent portions of the network from being isolated due to link failures. Also, multiple paths can be used simultaneously to load-balance data between the paths. However, redundant paths introduce the possibility of circuitous paths or "loops" being formed. Bridges generally make forwarding decisions based on address look-ups which are very fast and simple. The creation of a loop in a bridged network causes data frames to be continuously traversing the loop until the network saturates and also creates ambiguities in the address-table. To permit the existence of redundant communication paths but to avoid the looping problem mentioned, a method of "pruning" a network into a "tree" configuration is described in Chapter 4 of IEEE 802.1D and in Chapter 3 of the book "Interconnections: Bridges and Routers" by Radia Perlman, both of which are incorporated herein by reference. This method is called the "spanning tree protocol".

OBJECTS OF THE INVENTION

A first object of the invention is to provide a mechanism for quickly reconfiguring a meshed network of switches into a spanning tree topology after the removal of a link which causes a bridge to lose connectivity to the root bridge. A second object of the invention is to maintain operational compatibility with the IEEE Standard 802.1D such that arbitrary mixtures of network bridges which have implemented either the existing standard spanning tree protocol or the fast link-failure converging spanning tree protocol of the present invention will interoperate with improved, or identical network performance as compared to the standard spanning tree protocol. A third object of the invention is to define a class of mechanism for bridges to determine that a spanning tree path to the root bridge still exists after the detection of a fault. A fourth object of the invention is to utilize the information of root bridge path existence to quickly reconfigure the existing network into a spanning tree.

SUMMARY OF THE INVENTION

The present invention is directed to a class of algorithms for the automatic reconfiguration of a network in the event of a link failure. A configured spanning tree comprises a network of bridges, one of which is known as the root bridge. All of the other bridges have a single connecting path to this root bridge through a port known as the root port either directly, or through other bridges participating in the spanning tree, each of which also have a root port. Loops are avoided by placing ports forming redundant paths in a blocked state, wherein they do not receive or send data traffic. An algorithm common to all of the bridges selects which ports are forwarding data in the spanning tree, and which are blocked, and not forwarding traffic, thereby effectively eliminating network loops. Adjoining bridges exchange frames called BPDUs to make the decisions of which port is forwarding and which is blocking. When the network is stable, all bridges in the network have moved their ports into forwarding or blocking states in such a way as to form a spanning tree and remove loops. In such a state, on every port a bridge is either receiving these BPDUs or transmitting them. It may be receiving on some ports and transmitting on some others at the same time. But on any given port, it is either transmitting or receiving. The network is said to have converged in such a state. The port via which a bridge can reach the root bridge is its root port. The ports via which a bridge provides other bridges in the network a path to the root are called designated ports of that bridge. Under stable conditions, a bridge receives BPDUs from its root port and transmits these BPDUs to all bridges connected to its designated ports. In the event of a failure on a link caused, for example, by a cable fault, the information ordinarily transmitted between bridges to maintain the spanning tree is no longer received at the receiving port of a bridge. Ordinarily, the failure to receive these configuration frames for the time known as max_age having a default time of 20 seconds results in a reconfiguration, which requires an additional default time of 30 seconds before the network is once again configured into a new stable spanning tree, and forwarding traffic. During this 50 second interval from the moment the link is broken to the time the network has reconfigured into a new spanning tree, the network is unable to forward data traffic and users experience a loss in service.

The present invention enables surrounding bridges to detect when a bridge has lost connectivity to the root bridge and enable a faster reconfiguration of the network. When the bridge loses connectivity to the root bridge, as per the IEEE 802.1D standard, it begins reconfiguration by attempting to become the root bridge. It sends out a spanning tree protocol BPDU with itself as the root bridge. As implemented in prior art systems, and as defined in the IEEE standard 802.1D for the spanning tree protocol, this BPDU ignored by the surrounding bridges, because it is an inferior BPDU. The present invention enables surrounding bridges to act upon the reception of these inferior BPDUs. On receiving an inferior BPDU, a bridge sends a new BPDU, known as a Root Link Query (RLQ) request BPDU, to determine if a path to the root bridge is still available. If the path to root is still available, the bridge originating the RLQ request BPDU expires the max_age timer on the port receiving the inferior BPDU and selects the blocked port via which it confirmed the existence of alternate path to the root as its new root port. If the path to the root is no longer available via a port, the bridge immediately expires the max_age timer on that port. Thereafter, the standard spanning tree protocol is applied to re-compute which ports are to be in forwarding state and which are to be in blocking. Following normal spanning tree protocol rules, the bridge then transmits the availability of an alternate path via all its currently designated ports. The bridges attached to these ports may then use these links after the normal 2*Fwd_Delay time. Thus the bridge which lost connectivity to root can re-establish connectivity via a new path. This Root Link Query and subsequent unblocking of a previously blocked port prevents the loss of network utilization for the Max_Age time-out interval, thereby reducing the network unavailability by Max_Age, nominally 20 seconds.

BRIEF DESCRIPTION OF THE DRAWINGS

FIG. 1 is the block diagram of a network bridge.

FIG. 2 is an IEEE 802.3 frame.

FIG. 3 is a detail showing the arrangement of data in the address table of FIG. 1.

FIG. 6c is the receive process for the spanning tree protocol.

FIG. 7 shows the receive data structures for spanning tree protocol.

FIG. 8 shows the transmit data structure for spanning tree protocol.

FIG. 9 shows a transmit BPDU.

FIG. 14 shows the time sequence of reconfiguration for the standard spanning tree protocol.

FIG. 16 shows the time sequence of reconfiguration.

DETAILED DESCRIPTION OF THE INVENTION

Figure 4:
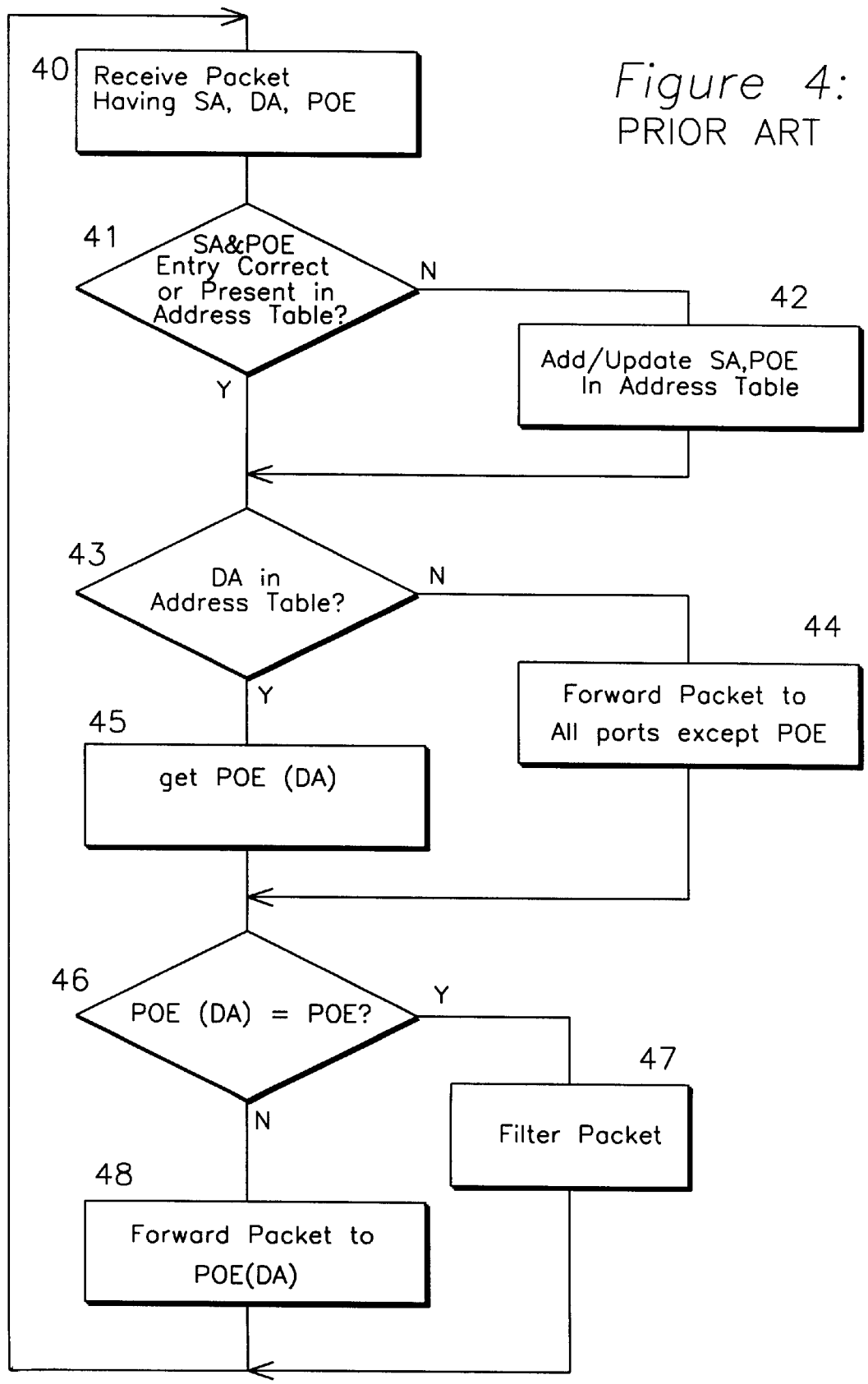
FIG. 4 is a flowchart showing the operation of a bridge.

FIG. 1 shows a typical network layer 2 bridge. Bridge Core 10 receives frames from port #1 12-1, port #2 12-2, and so on. Address Table 14 may be either a shared resource presented to all ports through the bridge core 10 or individually associated with each port 12-1,2,3 etc. Each frame which arrives at a port 12 is subject to an address search to determine which other port it should be forwarded to, if any, as will be described later. The OSI layer 2 address describled earlier is the MAC address 16, which is a fixed and unique value used in the spanning tree protocol as a component of the bridge identifier.

FIG. 2 shows the data format of an IEEE 802 frame, as described in IEEE 802.1. The relevant fields of interest to the bridge are the 6 byte destination address 22, and the 6 byte source address 24. The remainder of the frame contains control fields 26 comprising optional tag as described in IEEE 802.1Q, length, destination service access point, source service access type, and a control field. The data field 28 is variable length 39 to 1497 bytes, and the frame check sequence 30 contains error-checking utilizing a CRC polynomial. The contents of the remainder of the data 28 is not generally of interest to a bridge operating on the layer 2 MAC addresses 22 and 24. The destination address 22 is the MAC address of the desired end station in the network, while the source address 24 is the MAC address of the originating station in the network. In general, this is sufficient information for both the learning of addresses on the network and the delivery of frames to desired destinations because the source and destination addresses 22 and 24 of each 802 frame are not modified with each forwarding event from one bridge to another. In this manner, each bridge may keep a record of source addressees, so the location of each station is known to be present on a particular port of a bridge.

FIG. 3 shows the data associations for address table 14. Each MAC address 30a,b,c has an associated port of entry 31a,b,c. By keeping track of the source addresses of frames which are presented to each port in the bridge, the bridge is able to learn the port which is associated with each source address.

FIG. 4 shows the processing flowchart for each received frame. An 802.3 frame of the type described in FIG. 2 and having for the purposes of example SA=B2 and DA=B5 is received at a port 12-1. The bridge core 10 extracts the destination address (DA) 23, the source address (SA) 24, and the port of entry (POE) 12-1 in first step 40. Step 41 looks in the address table of FIG. 3 to determine if the source address B5 is present. If the source address is not known to the bridge, or it is associated with a port of entry which is no longer current, it is added or updated in step 42. In this example, it was previously added as entry 30a, and port of entry P1 was added as entry 31a. Step 43 examines the destination address (DA) 22 to process the received frame in one of the following 3 classes. If the destination address is not known to the bridge as in step 43, the frame should be forwarded to all ports of the bridge except the port of entry, as described in step 44. This is also the case for frame with a multicast/broadcast DA. If the DA is known to the bridge as in step 46, then it is either local to the port and the received frame should be filtered (not forwarded to any other port) as described in step 47, or the DA is known to be on a different port, and the received frame should be forwarded to that port as described in step 48. In this manner, the bridge is able to forward frames to only the desired port when the destination address is known to the bridge.

Changes in network topology are accommodated in two ways. With the passage of time, entries are periodically deleted from the address table, starting with the oldest entries. In this manner, as equipment is removed from the network, so are the address references removed from the address table. If network equipment is removed from one location and added to a different location, during the SA lookup phase 41 and 42, an updated POE entry would be made to the address table to reflect this topology change.

Figure 5A:
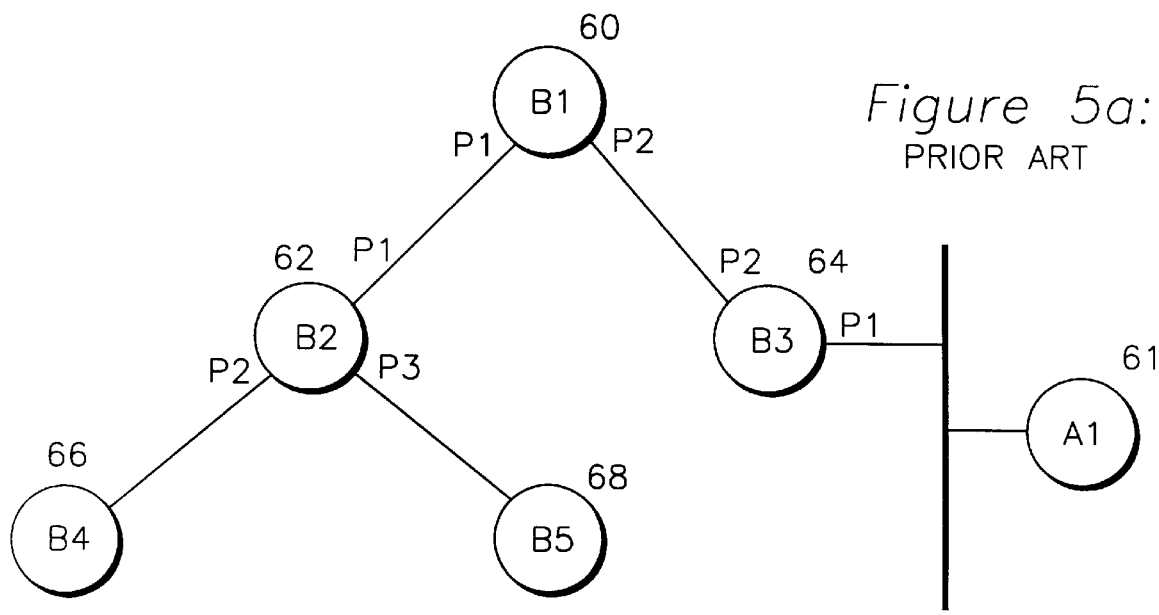
FIG. 5a is a loop-free network topology.
Figure 5B:
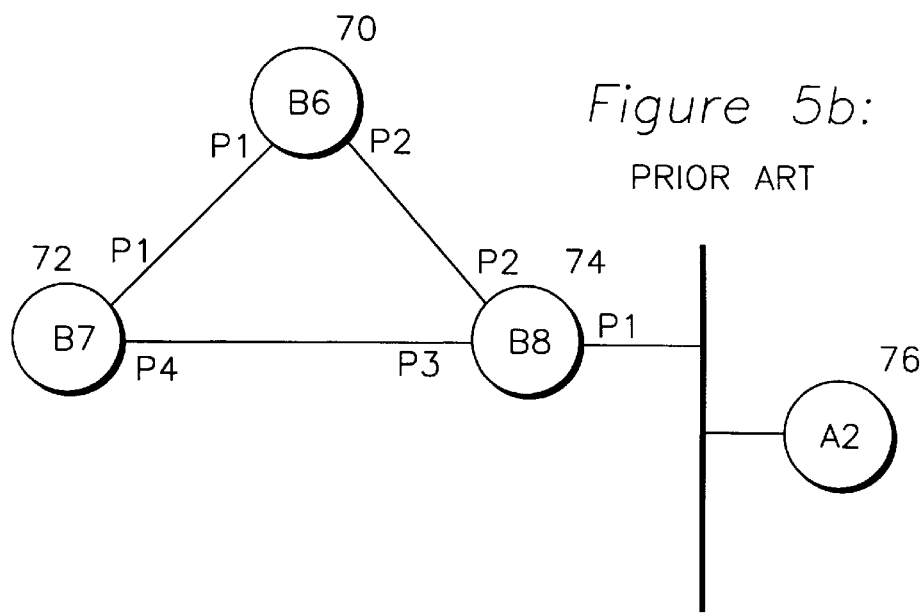
FIG. 5b is a network topology having redundant communication paths and thus, a loop.

FIG. 5a shows a loop-free topology for a network having 5 bridges B1 through B5 and a LAN station A1. After learning the network as described in 41 and 42, the address table 14 for bridge B1 60 would contain entries as shown in FIG. 3. The address entries B2 30a, B5 30d, and B4 30c would each show a POE of P1 as shown in 31a, 31d, and 31c, while bridge entry B3 30b and LAN station A1 30e would show a POE of P2, the respective values of 31b and 31e. A frame carrying SA=A1 and DA=B5 would be successively forwarded from station A1 to bridge B3 64, B1 60, B2 62, and B5 68. FIG. 5b shows a meshed network in which a packet can indefinitely traverse due to the presence of loops. In this example, there is ambiguity as to where to forward received frames, and as will be seen, each forwarded frame generates additional duplicate frames. For example, during address learning, the first unicast by station A2 would be forwarded by B8 74 to B6 70 and to B7 72. At this instant, each bridge B6 70, B7 72, and B8 74 would believe address A2 to be on ports P2, P4, and P1 respectively. Thereafter, B6 70 and B7 72 would forward the frame to each other, after which the address table entries for B6 and B7 would be replaced with POE=P1 and P1, respectively. Both would forward to B8, which would thereafter change its address tables to show a POE=2 or 3, and the frame would forever circulate through the ring, spawning new frames with each circulation around the ring in endless search for a destination, and causing the address tables to be updated with each forwarding. The same also happens when the DA is a multicast or the broadcast address and it is known as multicast/broadcast storm.

There are severe detrimental effects of such network behavior. First, the bandwidth of the network is continuously consumed with extraneous frames; the frame flooding increases with the number of loops such that a 2 loop network will rapidly flood to saturation and preserve this network flooding is a steady state condition until the loop is removed. Also, the address tables which are generally optimized are flooded with meaningless topology changes. The spanning tree protocol was devised to allow the creation of topological meshes in layer 2 networks. The spanning tree protocol prunes the meshes from a network until the network comprises a root and a series of network branches which fully span the network without introducing loops. The spanning tree protocol is fully described in IEEE 802.1D.

Figure 6A:
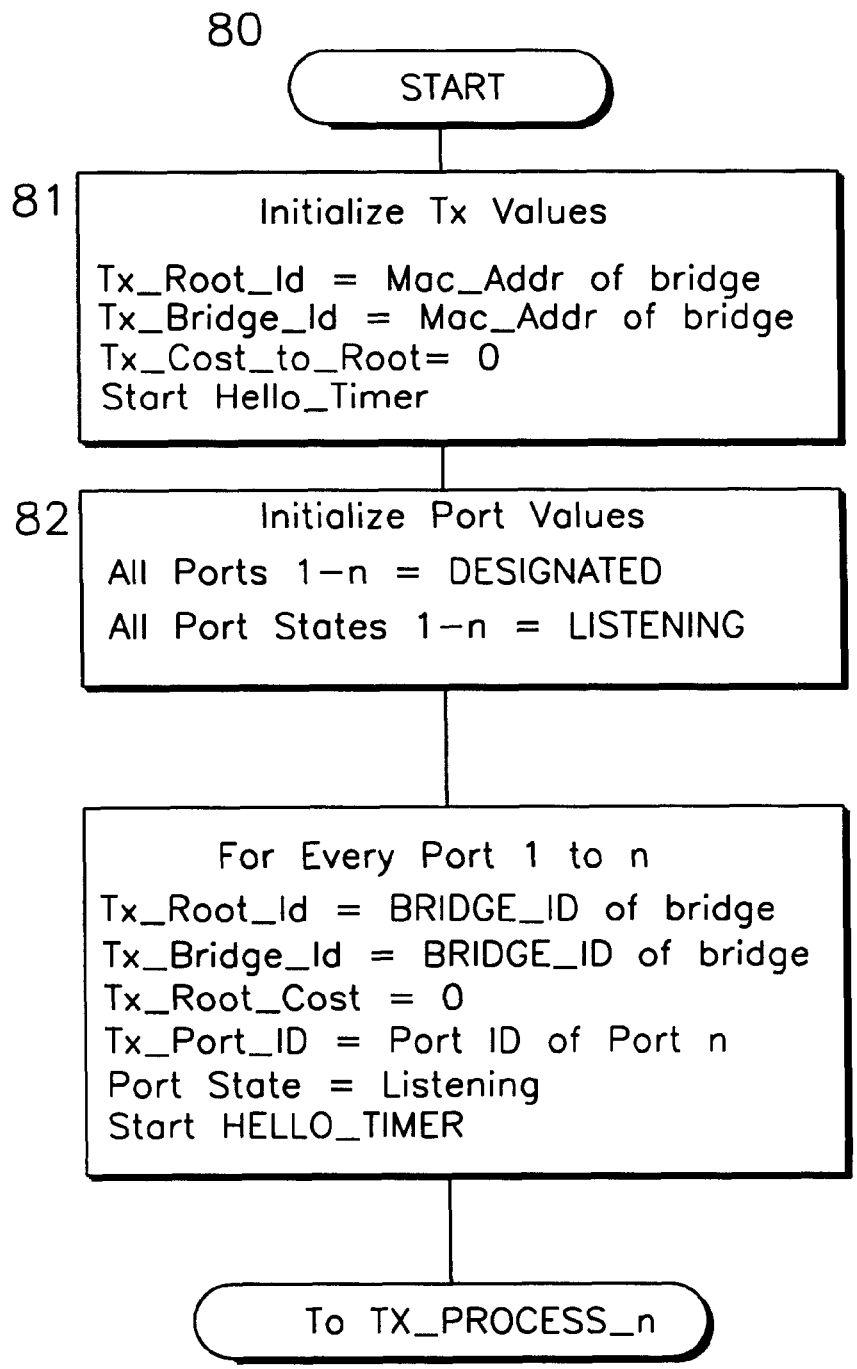
FIG. 6a is the initialization sequence for the spanning tree protocol.

FIGS. 6a,b,c,d, and e describe an example of the implementation of spanning tree protocol. As is clear to one skilled in the art, these flowcharts are given to clarify the operation of the spanning tree protocol, and there are many alternate means for implementing or describing the spanning tree protocol which is specified in IEEE 802.1D, for which these accompanying flowcharts represent one such implementation. Every port in a bridge which is connected to another active network device participates in the spanning tree protocol. Processes and variables names use the suffix __n to indicate that they apply only to port n of the bridge. Variables without the __n suffix are assumed to be global across all ports of the bridge, and each bridge is assumed to have the spanning tree protocol independently executing of the other bridges in the network. Every bridge has a bridge identifier which consists of two components, one of which is a user-configurable priority and the other is the MAC address of the bridge. The bridge identifier is unique for every switch in the network. Every port has a port identifier which also consists of two components, a user-configurable priority and a port number. A port identifier is unique for a port on a bridge. While the definitions of bridge and port identifiers have been defined thus for purposes of illustration, anyone skilled in the art would know that any unique identification scheme could be used to identify bridges and ports.

FIG. 6a shows an initialization procedure which begins execution at start point 80. Transmit initialization block 81 sets the initial values for the transmit configuration BPDU for each active port in the bridge. The Tx_BPDU_n sent by this bridge contains the Tx_Root_ID, the Tx_Cost_to_Root, the Tx_Bridge_ID and the Tx_Port_Id, along with configuration variables propagated throughout the spanning tree. The Tx_Root_ID is the bridge identifier of the root bridge, the Tx_Cost_to_Root is the path cost to the root bridge from this bridge, the Tx_Bridge_ID is the bridge identifier of this bridge and the Tx_Port_Id is the port identifier of the transmission port. The initialization of Tx_BPDU_n occurs in step 81, which sets the Tx_Root_ID and Tx_Bridge_ID both to the bridge identifier for this bridge, the Tx_Cost_to_Root to be 0 and the Tx_Port_Id to be the port identifier for that port. These are the initial values for Tx_BPDU_n wherein each bridge attempts to be the root bridge. Initialization step 82 also sets the port state of every port to be LISTENING. All ports are designated ports at this point.

Figure 6B:
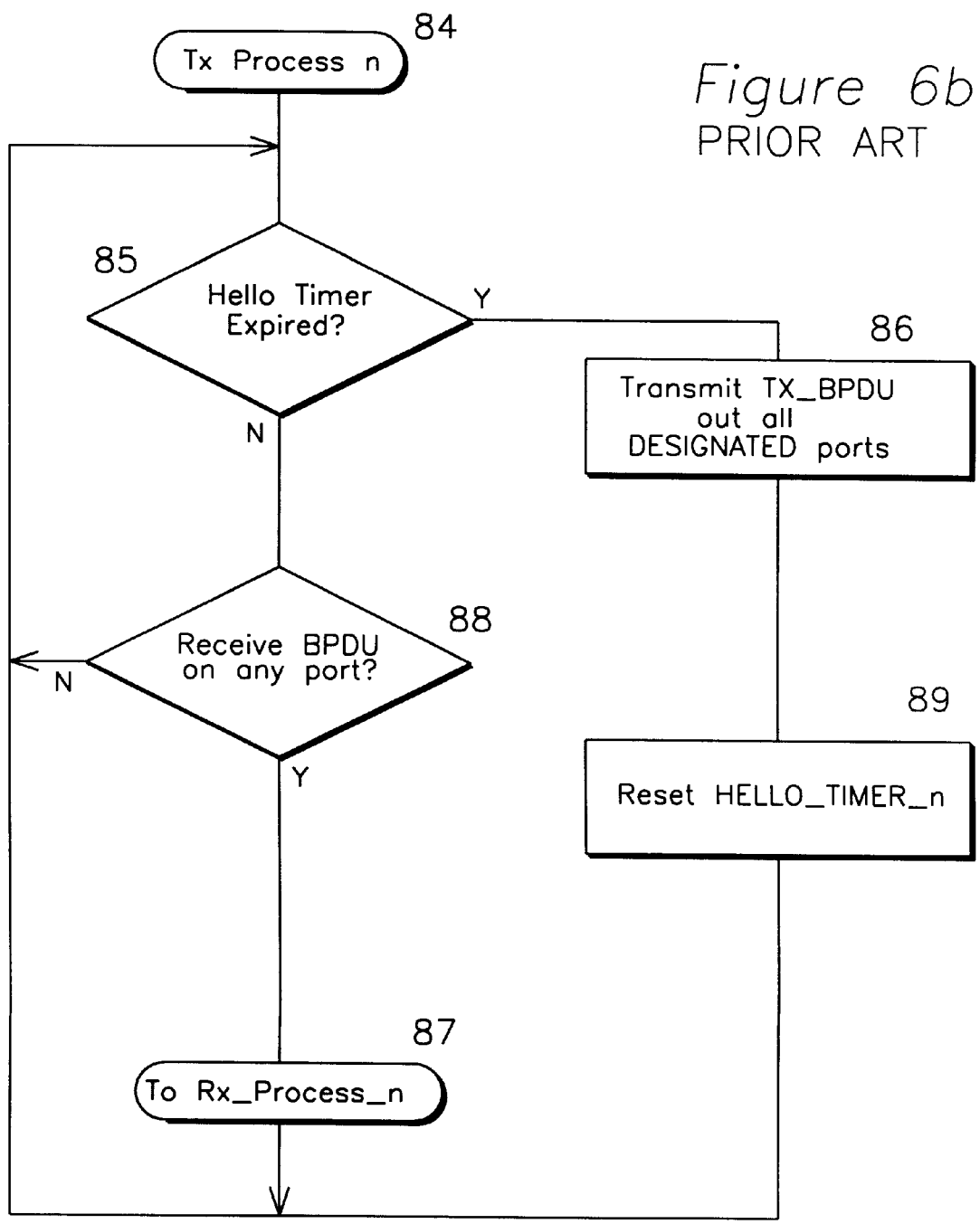
FIG. 6b is the transmit process for the spanning tree protocol.

Execution continues to Tx_Process_n, the transmit process 84 of FIG. 6b. The hello_timer is a timer used to ensure the transmission of Tx_BPDUs every hello_time seconds, which is defined by the IEEE standard 802.1D as 2 seconds nominal. The hello_timer is started only on the root bridge. In the case of hello_timer expiry, the Tx_BPDU_n is sent on each of the DESIGNATED ports as shown in 86, followed by a reset of the hello_timer in step 89.

Figure 6D:
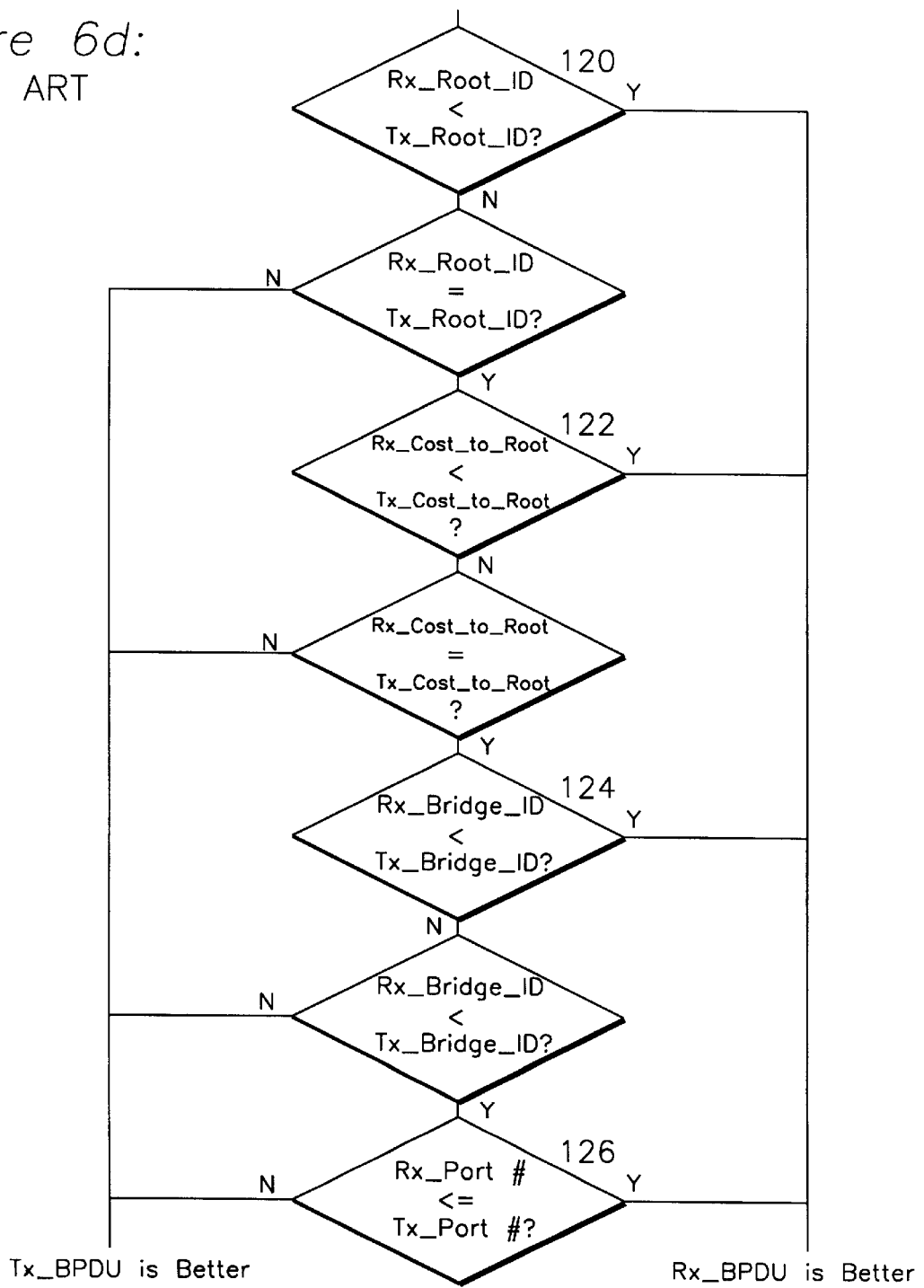
FIG. 6d illustrates the BPDU comparison sequence.
Figure 6E:
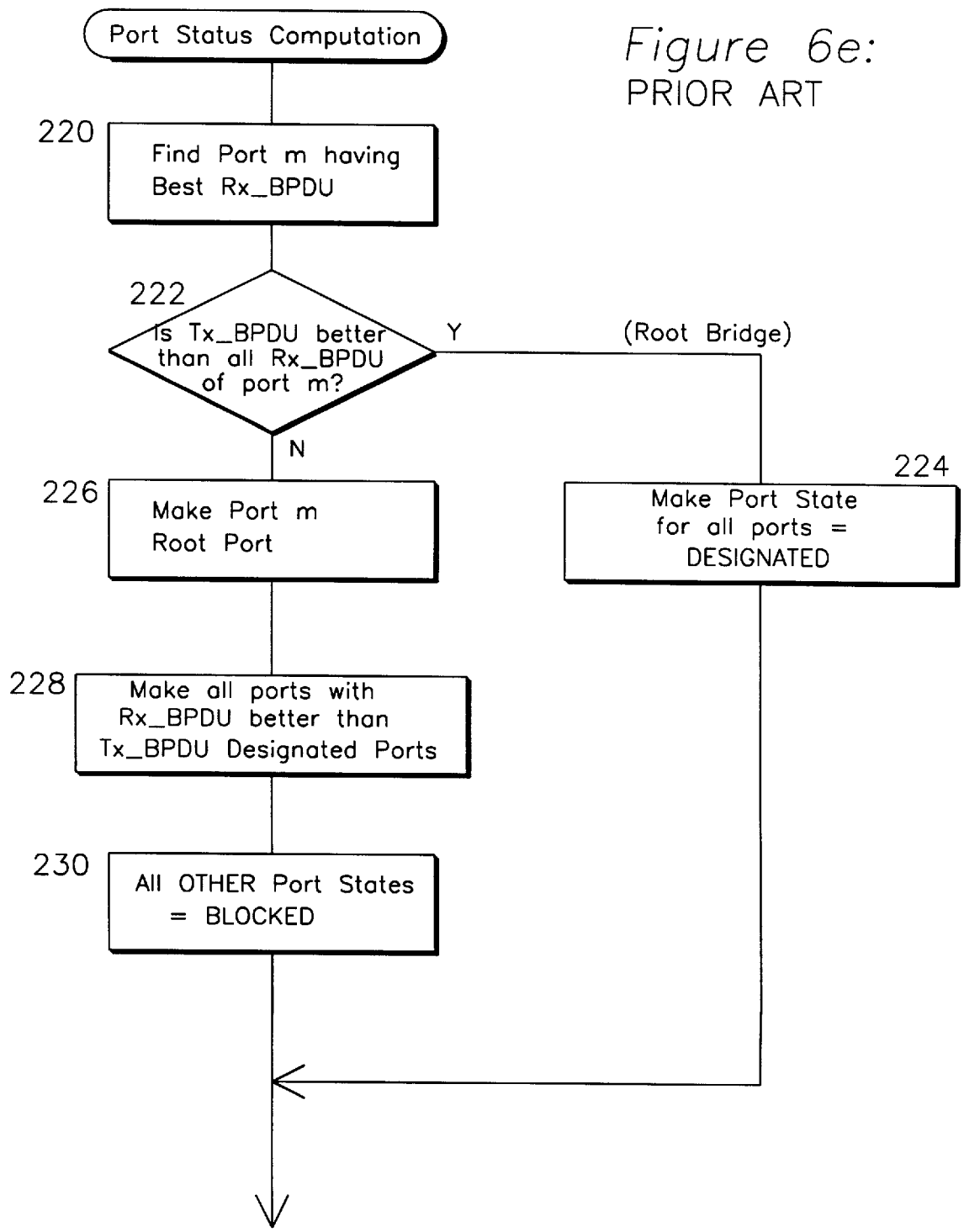
FIG. 6e shows the port status computation.

The reception of a BPDU 88 on any port invokes the receive process 87 shown in detail FIG. 6c. The first step is to examine link status 90. The loss of link causes the immediate expiry 91 of Max_Age_n timer and also causes the port connected to that link to be removed from the spanning tree calculations. The examination of link status and resultant expiry 91 of Max_Age_n timer would normally be handled by an independent process checking for link integrity, but is shown here for clarity. The Max_Age_n timer ordinarily expires upon the passage of Max_Age time between received BPUDs on an active port. The expiration of Max_Age_n timer either by early expiration 91 promoted by loss of link, or by the passage of time between Rx_BPDUs on a port causes the bridge to re-compute which bridge is the root bridge, which port is the ROOT port, which ports are DESIGNATED ports, and which ports are BLOCKED ports, as shown in routine 94. If the Max_Age n timer 92 has not expired, the Rx_BPDU_n is compared to the Tx_BPDU_n in step 96. If the Rx_BPDU_n is better than or is the same as Tx_BPDU_n, recomputation of root bridge status and individual port status occurs just as in the case of the expiry of the timer Max_Age_n i.e. routine 94. The port status computation process of step 94 is shown in FIG. 6e.

FIG. 7 shows the organization of received information as it is received on each of ports 1 through n of this bridge. The receive data structure of FIG. 7 is examined to find the "best" BPDU among all received BPDUs. FIG. 6d illustrates this process of finding the "best" BPDU for the case of comparing a received BPDU to a transmitted BPDU. Applying this same algorithm to a pair of received BPDUs, the Root_IDs are compared as shown in step 120, and the lowest Root_ID is better. If they are found to be equal, a second comparison 122 is done on the Cost_to_Root, with the lowest found to be better. If these are still equal, the next comparison 124 is done on the basis of Bridge_ID, with the lowest being better. If these are still equal, the next comparison 126 is done on the basis of Port_Id, with the lowest being better. In this manner, the better BPDU is found from among the two compared. In FIG. 6e, this computation of the best BPDU is conducted across the Rx_BPDUs on each of ports 1 through n, as shown in step 220. If the Root_Id of the best Rx_BPDU is the same as the Bridge_Id of this bridge, then this bridge is the root bridge. Otherwise, the port having the best Rx_BPDU is set to ROOT port status in step 226. The Tx_BPDU_n of all ports is updated to reflect the new values of Tx_Root_Id, Tx_Cost_to_root and Tx_Bridge_Id which are basically the values obtained from this best Rx_BPDU. All ports having inferior Rx_BPDU_n compared to the Tx_BPDU_n are set to be DESIGNATED ports in step 228, and ports which are neither ROOT nor DESIGNATED become BLOCKED ports in step 230.

Referring again to FIG. 6c, the port status for each port is now established and the re-computation of port status for all ports on the bridge in step 94 is accomplished. In the present example, the Rx_Root_ID for port n is the bridge identifier of the distant bridge attempting to be the root bridge, and the Tx_Root_ID is the bridge identifier believed by this bridge to be the root bridge. The "better" Root_ID subsequently becomes the Tx_Root_ID transmitted by this bridge. In the initial case, each bridge is attempting to become root, and when the adjacent bridge has a better Root_ID (either its own, or that of an adjacent bridge), it uses this "better" Root_ID as its Tx_Root_ID. Eventually, after some exchange of BPDUS, all of the bridges converge on the same Root_ID, and the next basis of comparison is the Cost_to_Root. The Cost_to_Root is calculated in the following way. A root bridge transmits a cost of 0. Initially, this is meaningless, as all of the bridges are attempting to become root, but the first determination of which bridge will become root bridge is done on the basis of the bridge having the lowest bridge identifier. The cost for each link is currently defined in the IEEE 802.1D standard to be 1000/LS where LS is the link speed in millions of bits per second (Mbps). Therefore, the cost of a 10 Mbps port is 100, and the cost of a 100 Mbps port is 10. The Tx_Cost_to_Root sent by a bridge is the lowest Rx_Cost_to_Root received on a port on that bridge plus the cost of that receiving link. Therefore, a bridge receiving a BPDU on a 100 Mbps link would add 10 to the Rx_Cost_to_Root and add 100 to the Rx_Cost_To_Root for BPDUs received on a 10 Mbps port. A bridge with both these connections toward the root bridge would therefore choose the 100 Mbps port as having the "better" BPDU. For the case where the above parameters are still identical, the comparison is done on the basis of Bridge_ID, as shown in 124. The final comparison is done on port identifier, as shown in 126. The end result of the comparison of FIG. 6d is for each link to be examined for which produces the "better" BPDU, and the net effect is that the better BPDU will be adopted as the Tx_BPDU by each bridge receiving it. Following this port status computation of step 94, the Rx_Process_n 87 proceeds to step 106. In step 106, a check is made to see if this bridge is the root bridge. If this bridge is the root bridge, the hello_timer is started in step 108, and Tx_BPDUs are sent to all DESIGNATED ports in step 114, thereby ending the Rx_process_n and returning control to step 85. Also, if the BPDU received was on the ROOT port, the bridge transmits Tx_BPDU_n out all designated ports as shown in step 114. It also restarts the Max_Age_n timer on the ROOT port as in step 112.

The next case to consider in FIG. 6c is the case where an inferior BPDU is received on a DESIGNATED port. This typically happens during initial spanning tree configuration, when all of the bridges are attempting to become root, and all of the ports are DESIGNATED ports, and therefore sending Tx_BPDUs. Initially, inferior BPDUs are received on DESIGNATED ports, and the response by a bridge is to respond with its better Tx_BPDU_n in step 100, which causes the remote bridge to stop sending inferior BPDUs on this link, and to keep the better BPDU in its Rx port table. The final case is that of an inferior BPDU received on a ROOT or BLOCKED port. In the current IEEE 802.1D standard and in prior art, this inferior BPDU is ignored and discarded as shown in step 104. The present invention will disclose alternate processing in step 104 for these inferior BPDUs.

Figure 13:
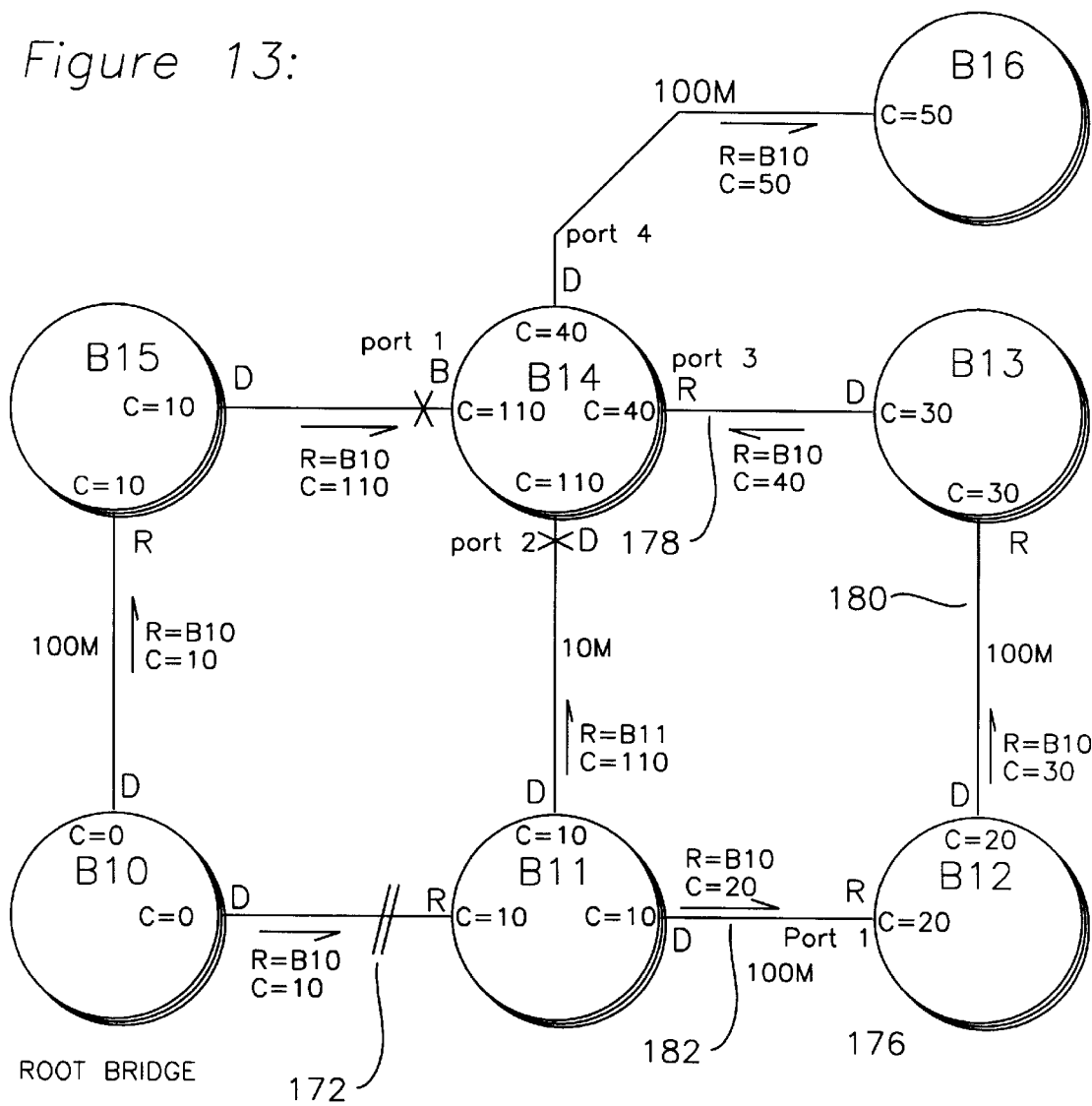
FIG. 13 shows an example of a spanning tree network configuration before a link fault.

FIG. 7 shows the receive BPDU data structures for the converged spanning tree configuration for the network of FIG. 13. Each port keeps a copy of the received BPDU from that port to compute root_port, root bridge, and the port status. In this example, the Rx_Root_ID has propagated through the system as B10 for all ports. The cost-to-root information is also kept for each port, as is the Bridge_ID. For clarity, received BPDU port number information is also stored, but not shown on this diagram. Port status may now be determined from the data values in the table of FIG. 7. The ROOT port is determined in this example as port 3, as it has the best Rx_BPDU of any port. As the Rx_BPDU of port 3 identifies a better Root_Id from this bridge, this bridge is not the root bridge. Accordingly, port 3 is the ROOT port. The only remaining port which has a better TX_BPDU than Rx_BPDU is port 4, which makes it a DESIGNATED port, and the remaining ports 1 and 2 are BLOCKED.

FIG. 8 shows the transmit BPDU data structure for bridge B14 in FIG. 13. The Tx_Root_ID is that of the lowest bridge, B10. The Tx_Cost_to_Root is that of the root port 3, while the Bridge ID is the MAC Address of the bridge. The user modifiable variables Tx_Message_Age, Tx_Max_Age, Tx_Hello_Time, and Tx_Fwd_Delay are all taken from the root bridge, and propagated through the spanning tree, so that all bridges are using consistent values for these system parameters.

FIG. 9 shows the Tx_BPDU of IEEE 802.1D, into which the values of FIG. 8 are placed.

Figure 10:
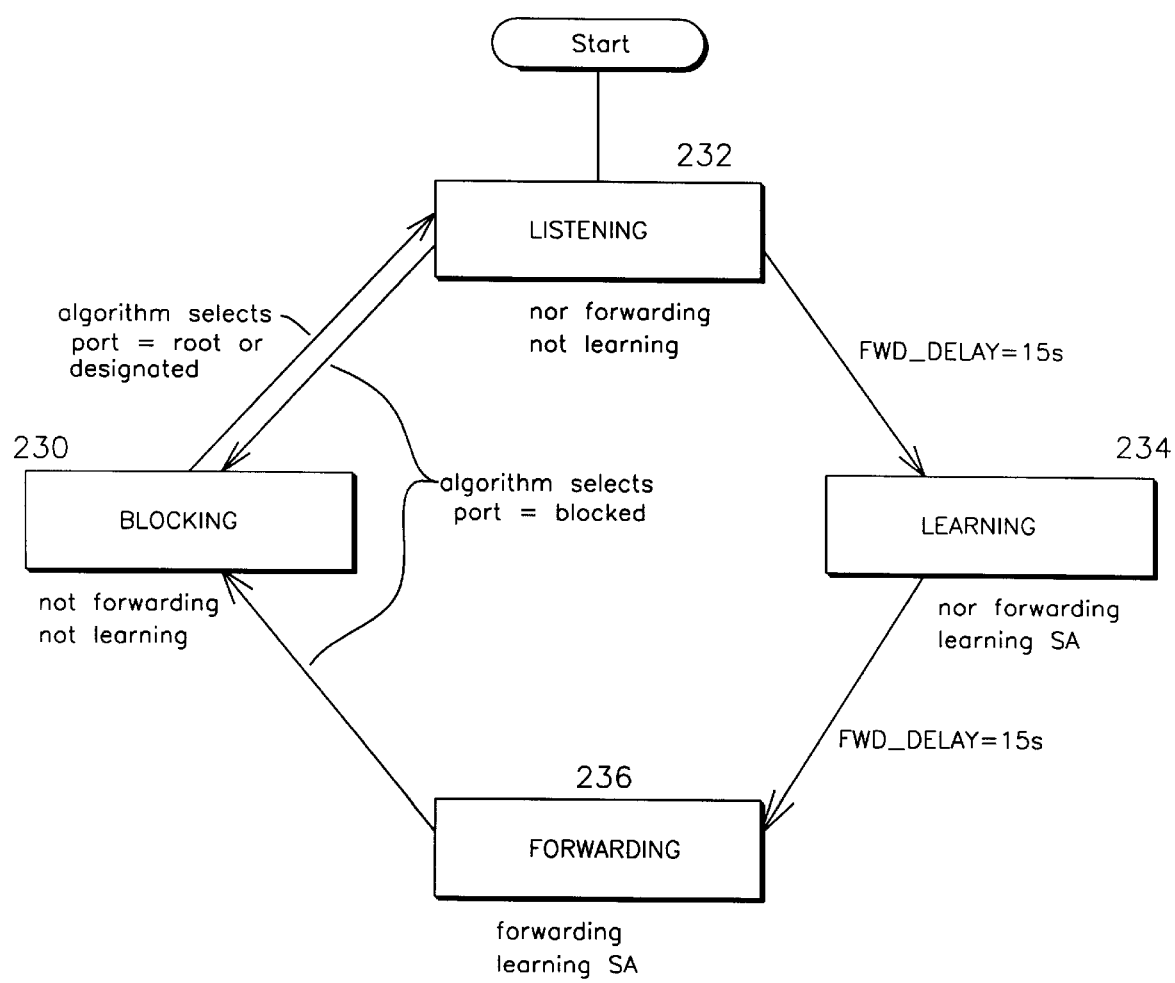
FIG. 10 shows the state table for the spanning tree protocol.

FIG. 10 shows the state transitions between port states. Initially, all ports are placed in the blocking state 230. Upon port selection of ROOT or DESIGNATED port according to the algorithm 98 described earlier, the port state may move to the listening state 232, during which the port is neither learning new source addresses, nor forwarding traffic. The port remains in the listening state 232 for Fwd_Delay, which has a nominal value of 15 seconds, after which it may move to the learning state 234, wherein source addresses are added to the address table, but frames are not forwarded. After an additional delay of Fwd_Delay, the port is placed in forwarding state 236, during which new source addresses are added to the address table, and forwarding of traffic according to FIG. 4 is performed. The port may be moved to the blocking state 230 from any state 232 234 236 upon the result of the algorithm 98.

Figure 11:
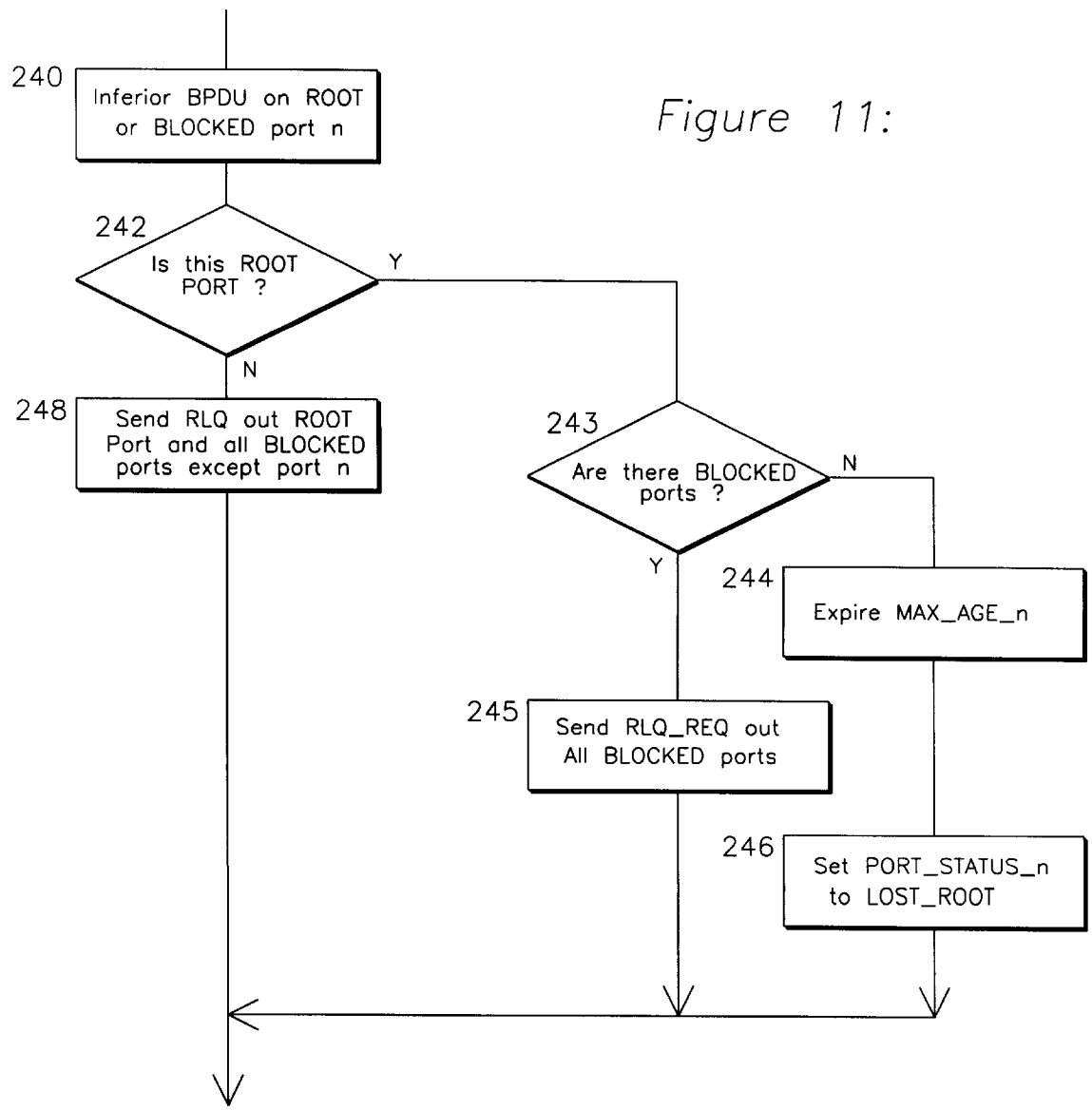
FIG. 11 shows the inferior BPDU handling added to the spanning tree protocol flowchart of FIG. 6c.

FIG. 11 shows the new processing of inferior BPDUs received on the ROOT port or a BLOCKED port of a bridge.

This new processing replaces the discard frame step 104 of FIG. 6c. The ROOT port and every BLOCKED port on a bridge (except a self-looped port—which is a port connected to another port on the same bridge) represents a possible path to the root bridge for which the root port is the currently used path. On receipt of an inferior BPDU on a root or blocked port, if a bridge can determine if one or more paths to the root bridge is still available, it can provide this path to the bridge which has lost connectivity to the root bridge, as identified by the transmission of inferior BPDUs. To determine which of its existing paths to the root are still available, a new type of spanning tree frame is sent out all possible paths to the root, such paths including the ROOT port and BLOCKED ports and excluding self-looped ports and the port which received the inferior BPDU. This newly defined frame is known as a Root-Link-Query-Request (RLQ-REQ) BPDU. FIG. 11 shows the new BPDU handling process of the current invention. The new process 240 is entered from step 104 of FIG. 6c. The inferior BPDU is still discarded as in step 104, but it is tested to see if it came in on a root port, and if there are blocked ports representing possible alternative paths to the root 243. If not, Max_Age_n is expired on the root port in step 244, and the port status of all ports on the bridge are recomputed as in step 94 of FIG. 6c as per normal spanning tree protocol rules. If there are blocked ports representing possible alternate paths to the root bridge, an RLQ-REQ is sent out all such blocked ports. If the inferior BPDU was received on a blocked or designated port, then the RLQ-REQ is sent out the root port and all blocked ports except the one the inferior BPDU came in on.

Figure 12:
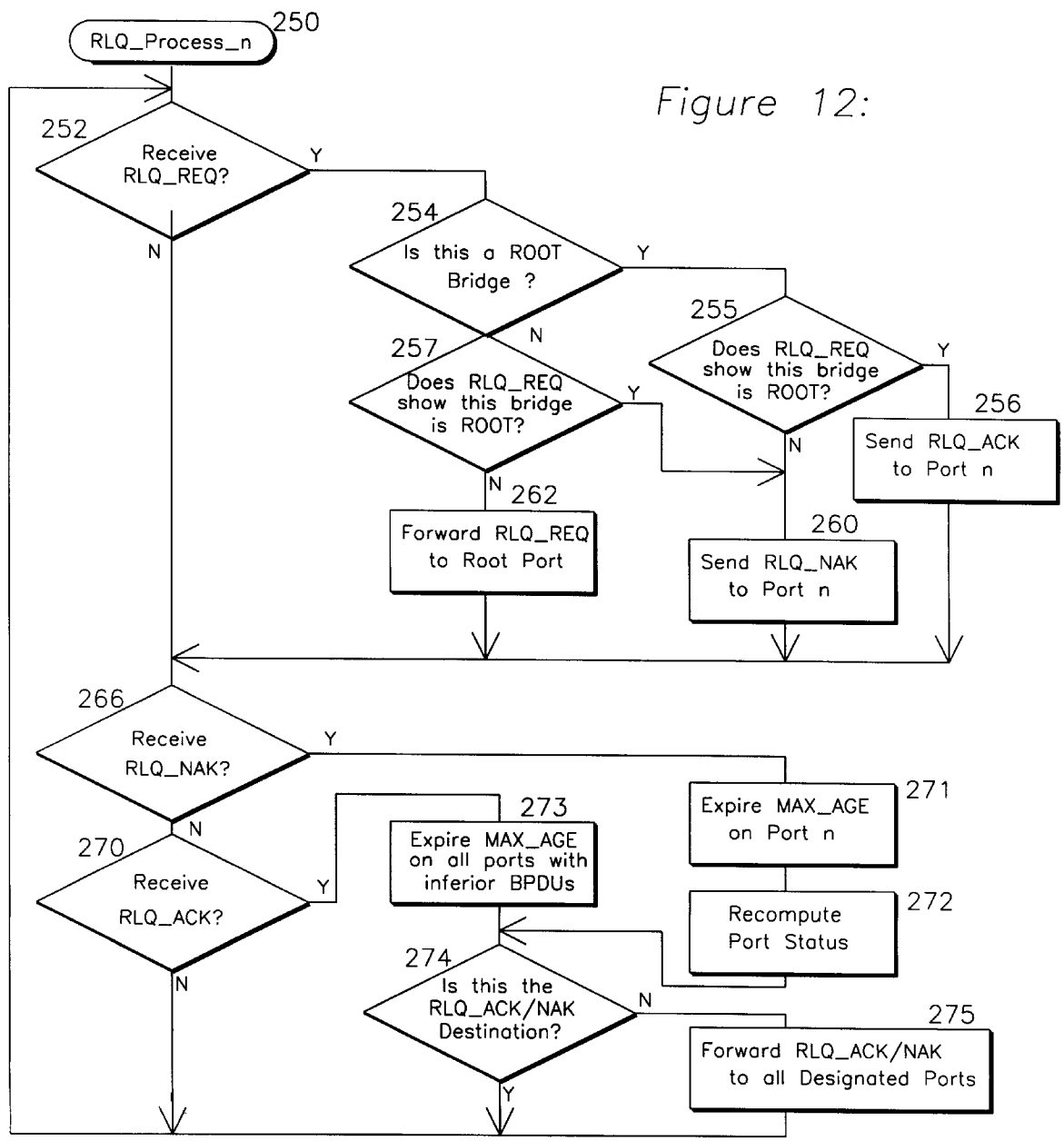
FIG. 12 shows the Root-Link-Query BPDU handling flowchart.

FIG. 12 shows a new process 250 which handles and responds to the new RLQ-REQ and RLQ-NAK frames. If an RLQ-REQ is received in 252, and the bridge is root 254, and the RLQ-REQ shows that the current bridge is root 257 then a special acknowledgment BPDU is sent, known as an RLQ-ACK. This RLQ-ACK is sent only to the port receiving the RLQ-REQ, and indicates affirmatively that a path to the root has been found. If this bridge is a root bridge because its Max_Age timed out, and it is attempting to become root, as evidenced by it having a different Tx_Root_ID from the Root_ID found in the RLQ-REQ-BPDU, a negative acknowledgment frame known as an RLQ-NAK is sent in 260. Similarly, if this is not a root bridge, but the Root_ID identified in the RLQ-REQ-BPDU is different from this bridge's Tx_Root_Id, an RLQ-NAK is sent in 260. If this is not a root bridge, and the Root_Id identified in the RLQ-REQ-BPDU is the same as the Tx_Root_Id of this bridge, then the RLQ-REQ frame is forwarded to the root bridge via the root port. In this manner, RLQ-REQ frames are forwarded up the spanning tree to the root bridge, where they either reach the root bridge identified in the RLQ-REQ_BPDU which responds with a positive acknowledgment (RLQ_ACK), or they reach a bridge which has a different Tx_Root_Id from the one in the RLQ-REQ-BPDU, and this bridge responds with a negative acknowledgment (RLQ-NAK). Step 266 is this case where an RLQ-NAK was received. Max_Age is expired on the port the RLQ-NAK came in on, and port status is recomputed 272. Step 270 is the case where an RLQ-ACK was received. All ports having received inferior BPDUs have their Max_Age expired. The remaining processing for RLQ-ACK and RLQ-NAK is common in step 274. If the RLQ-ACK or RLQ-NAK is a response to an RLQ-REQ made by this bridge, no further processing is required, and the routine exits. If the RLQ-ACK or RLQ-NAK is a response to an RLQ-REQ made by a different bridge, then it is forwarded to all designated ports in step 275. This RLQ-REQ is forwarded from bridge to bridge until is reaches one that can affirm that the root link has been lost, or is still present. The RLQ-ACK or RLQ-NAK response is then is forwarded through the same path back to the bridge having originated the RLQ-REQ until it reaches this bridge. The result of this RLQ-ACK or RLQ-NAK response frame is then used to update the port status, and the spanning tree re-converges on a new configuration without waiting for Max_Age_n to expire on ports which have lost its path to the root bridge.

In order to permit proper handling of shared media (switches connected together using a layer 1 repeater or hub), the action of the new invention occurs only if the inferior BPDU is received from the DESIGNATED bridge of that port.

FIG. 13 shows a network which has configured itself according to the spanning tree protocol. Each bridge is shown with the particular BPDU it is sending on each link with the Root_ID and cost information. Each link only carries the BPDU sent by the better bridge. The configuration information sent and received by bridge B14 is shown in FIGS. 7 and 8. Root bridge B10 170 is sending the better BPDU, and each bridge is sending B10 as the Tx_Root_ID. Link 172 is assumed to be working properly at the beginning of this converged example.

FIG. 14 shows the time sequence for standard spanning tree convergence in the event of a break in link 172. At time 0, link 172 breaks, and according to step 90 in FIG. 6c, max_age for bridge B11 is immediately promoted to expiration, thereafter making all ports of B11 DESIGNATED ports and B11 thereafter attempts to become root bridge. Bridge B14 and B12 receive the inferior BPDUs sent by B11, but ignore them, in accordance with IEEE 802.1D, and as shown in step 104 of FIG. 6c. After the passing of max_age for B12, B13, and B14, these three bridges all attempt to become root, and the network reconfigures and quickly converges to the state shown in FIG. 15. At this point, max_age has passed, but the network does not yet forward traffic until the ports pass from blocking to listening to learning to forwarding. Globally this would take Max_Age+2*Fwd_Delay=20+2*15=approximately 50 seconds.

Figure 15:
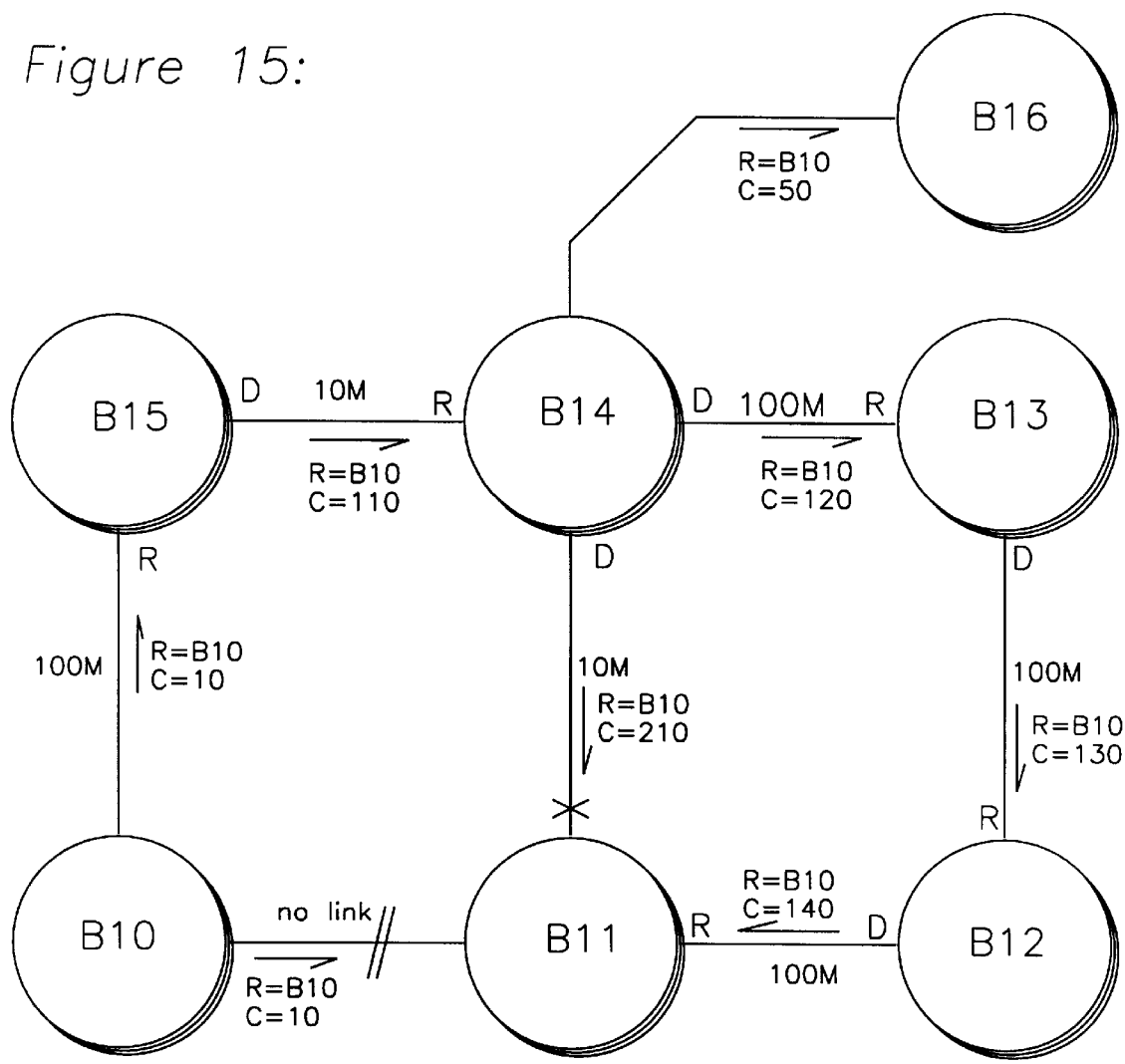
FIG. 15 shows the reconfigured network of FIG. 13.

FIG. 16 shows the time sequence for the spanning tree with fast link-failure convergence of the present invention. At time 0, link 172 breaks, and as before, B11 becomes root. Upon reception of inferior BPDUs from B11, B12 and B14 promote to expiration their max_age timers, as described in step 244. B14 additionally sends a RLQ_BPDU on link 178, which is forwarded only to link 180, and link 182, where B11 returns a RLQ_NAK to indicate loss of root, which is forwarded only along link 182 to link 180 to link 178. Thereafter, B14 acts on the reception of RLQ_NAK by changing ports 1 and 2 to DESIGNATED port, and sending a TX_BPDU on ports 1 and 2, which results in the rapid convergence of those ports to the same configuration as shown in FIG. 15. B13 reconfigures by responding to the BPDUs received on link 178. The improved time for spanning tree convergence is now 1–2 seconds for the propagation of the RLQ_BPDUs and DESIGNATED port BPDUs. Thereafter, the convergence is the same as that for standard spanning tree, as the ports must move from blocking to listening to learning to forwarding in the standard 2* Fwd_Delay, without having to additionally wait the Max_Age time of 6 to 40 seconds, as described in IEEE 802.1D, table 4-3.

There are many specific activities, tests, and sequences set forward in the previous best mode example, and it is clear to one skilled in the art that while the order of these activities, tests and sequences could be changed to accomplish the same improvement in convergence time, the underlying mechanism described herein would still be employed. It is clear to one skilled in the art that the elimination of the max_age delay after reception of inferior BPDUs through the early determination of a root link through explicit inquiry could be conducted many different ways, and the particular terminology of RLQ-REQ, RLQ-ACK, and RLQ-NAK used in this example is one such method, and other methods of inquiry to determine root bridge link could be used in accordance with the present invention. The above flowcharts and specific step methods are offered only as a vehicle for illustration, and the order and particular method for determining root link are not significant. Likewise, the methods set forth for the early discovery of a loss of link through the reception of inferior BPDUs are chosen for illustrative purposes, and are not meant to constrain the method of testing for the reception of inferior BPDUs on a converged network to that which has been shown. One skilled in the art would be able to substitute other tests for the discovery of inferior BPDUs indicating the loss of an indirect link and achieve the same results as shown here, and such techniques would fall into the general method previously described.

We claim:

1. A process operating on a bridge, said bridge having a plurality of ports, said bridge being either a root bridge or a designated bridge, said process rapidly reconfiguring a spanning tree after a link failure, each of said ports having a unique port state of ROOT port, DESIGNATED port, or BLOCKED port, only one of said ports on said bridge being in said ROOT state at a given time, said ports sending and receiving bridge protocol data units (BPDUs), said process comprising the steps:

upon the receipt of an inferior BPDU on either a port in said BLOCKED state or a port in said ROOT state, sending a root-link-query to all said ports in said BLOCKED state and to said port in said ROOT state, but not to said port receiving said inferior BPDU;

awaiting a root-link-query response from one of said ports in said BLOCKED state, or one of said ports in said ROOT state;

upon receipt of an affirmative root-link-query response from one of said ports in said BLOCKED state, thereafter changing the port state of said port receiving said affirmative root-link-query response from BLOCKED to DESIGNATED.

2. The process of claim 1 wherein said root-link-query comprises the transmission of an RLQ-REQ (root-link-query request) BPDU.

3. The process of claim 2 wherein said affirmative root-link-query response comprises the reception of said RLQ-REQ BPDU by a root bridge, said root bridge replying with said affirmative root-link-query response.

4. The process of claim 3 wherein said affirmative root-link-query response comprises the transmission of an RLQ-ACK (root-link-query acknowledgment) BPDU where the bridge receiving said RLQ-REQ BPDU is said root bridge.

5. The process of claim 4 wherein said affirmative root-link-query response comprises the transmission of an RLQ-NAK (root-link-query negative acknowledgement) BPDU where the bridge receiving said RLQ-REQ BPDU is not said root bridge and has not received a BPDU from a root bridge within a timeout period.

6. The process of claim 4 wherein said affirmative root-link-query response BPDU comprises the transmission of an RLQ-ACK BPDU where a bridge receiving said RLQ-REQ BPDU is not said root bridge and has received a BPDU from a root bridge within a timeout period.

7. The process of claim 4 wherein said bridge receiving said RLQ-NAK BPDU expires the Max_Age timer on the port receiving said RLQ-NAK BPDU.

8. The process of claim 7 wherein said bridge receiving said RLQ-ACK BPDU expires the Max_Age timer on all ports which have received inferior BPDUS.

9. The process of claim 8 wherein said bridge receiving said RLQ-ACK BPDU or said RLQ-NAK BPDU which is not the originator of said RLQ-REQ BPDU forwards said RLQ-ACK BPDU or said RLQ-NAK BPDU to all ports in said DESIGNATED state of said bridge.

10. The process of claim 9 wherein said RLQ-ACK BPDU, said RLQ-NAK BPDU, and said RLQ-REQ BPDU contain at least Root_ID, Cost_to_Root, and Bridge_ID.

11. An algorithm for the rapid detection of indirect link faults in a spanning tree on a bridge having a plurality of ports, each said port controlled by independent but concurrent processes:

a port state selection process controlling the state of each port of said bridge and having a plurality of port states for each of said ports, at least one of said port states is a forwarding state wherein frames arriving at a port in said forwarding state are forwarded to another port of said bridge, and at least another of said states is a blocking state wherein frames arriving at a port in said blocking state are not forwarded to any other port of said bridge;

a port transmit process for transmitting at least configuration Bridge Protocol Data Unit (BPDU) frames and root-link-query BPDU frames;

a root port selection process wherein one of said bridge ports becomes a root port, and the remaining ports become either designated ports or blocked ports;

a port monitoring process for receiving configuration BPDU frames and comparing each of said received BPDU configuration frames to said transmit BPDU configuration frame, and when said received configuration BPDU frame is inferior to said transmit BPDU frame and said port is in said blocking state, or is said root port, sending said root-link-query frame to said bridge root port;

a root-link-query monitoring process for receiving root-link-query frames from a DESIGNATED port and forwarding them to a ROOT port;

a root-link-acknowledgment process for determining that the bridge receiving said root-link-query frame is a root bridge, thereafter responding with a root-link-acknowledgment frame;

a port-state-control process which moves said port state from blocking to forwarding upon the receipt of said root-link-query-acknowledgment frame.

12. The process of claim 11 wherein said port transmit process sends said root-link-query frames containing at least a Bridge_ID and a Root_ID.

13. The process of claim 12 wherein said port-state-control process includes re-computing said port state utilizing said Bridge_ID and said Root_ID contained in said root-link-query frames.

14. The process of claim 13 wherein said root-link-query frames include at least a root-link-query (RLQ-REQ), and root-link-query negative acknowledgement (RLQ-NAK).

15. The process of claim 13 wherein said root-link-query frames include an RLQ-REQ, and root-link-query acknowledgement (RLQ-ACK), and an RLQ-NAK.

16. On a bridge, said bridge being either a root bridge or a designated bridge, said bridge having a plurality of ports, said ports for the transmission and reception of data frames and control frames, each of said ports having a port state of either blocked state whereby said ports in said blocked state are receiving but not forwarding data frames, or designated state whereby said ports in said designated state receive said data frames and forward them to other said ports, and one of said ports having a port state of root port, said port in said root state receiving and transmitting said data frames, a process operating on said bridge, said process for finding an alternate path to a root bridge comprising the steps:

sending a root-link-query request (RLQ_REQ) to all ports in said blocked state of said bridge;

upon the receipt of a RLQ_REQ on given port, either forwarding said RLQ_REQ to said root port of said bridge if it is not the root bridge, or sending an RLQ_ACK to said given port if the bridge is said root bridge, or sending an RLQ_NAK to said given port if the connectivity to said root bridge is known to be lost.

17. The process of claim 10 wherein among a plurality of BPDUs, said inferior BPDU is determined by comparing the values of said Root_ID.

18. The process of claim 10 wherein said comparison utilizes said Root_ID and said BRIDGE_ID of an incoming BPDU on a port in said designated state.

* * * * *